United States Patent
Celik

Patent Number: 5,880,377
Date of Patent: Mar. 9, 1999

[54] METHOD FOR LOW VELOCITY MEASUREMENT OF FLUID FLOW

[75] Inventor: Zeki Z. Celik, Sunnyvale, Calif.

[73] Assignee: LSI Logic Corporation, Milpitas, Calif.

[21] Appl. No.: 735,450

[22] Filed: Oct. 15, 1996

[51] Int. Cl.$^6$ .................................................. G01F 1/32
[52] U.S. Cl. ................................. 73/861.22; 73/861.23; 73/861.24
[58] Field of Search ......................... 73/861.22, 861.23, 73/861.24, 207.27

[56] References Cited

U.S. PATENT DOCUMENTS

| | | | |
|---|---|---|---|
| 3,564,915 | 2/1971 | Tomota et al. | 73/861.22 |
| 3,775,673 | 11/1973 | Watanabe | 73/861.22 |
| 3,948,097 | 4/1976 | Kurita et al. | 73/861.22 |
| 4,350,047 | 9/1982 | Dewey, Jr. et al. | 73/861.22 |
| 4,448,081 | 5/1984 | Kolitsch et al. | 73/861.22 |

OTHER PUBLICATIONS

Roshko, A., "On the Development of Turbulent Wakes from Vortex Streets," NACA Report 1191, 1955, pp. 1–25.

*Primary Examiner*—Richard Chilcot
*Assistant Examiner*—Max H. Noori
*Attorney, Agent, or Firm*—Conley, Rose & Tayon, PC; B. Noel Kivlin

[57] ABSTRACT

An apparatus is described which determines the velocity of a fluid flow stream by measuring the frequency of vortex shedding from an obstruction in the fluid flow stream. A constant known as the Strouhal number is used to relate the measured vortex shedding frequency to the fluid flow velocity. The Strouhal number is a function of the Reynolds number for the obstruction, which is also a function of fluid flow velocity. Hence, an iterative technique is provided, first using an estimated Strouhal number to estimate the fluid flow velocity, using the estimated fluid flow velocity to estimate the Reynolds number, then using the Reynolds number to get a better estimate of the Strouhal number. The apparatus repeats this cycle until the estimate of the fluid flow velocity converges.

8 Claims, 3 Drawing Sheets

METHOD FOR LOW VELOCITY MEASUREMENT OF FLUID FLOW

BACKGROUND OF THE INVENTION

1. Field of the Invention

This invention relates to the field of fluid flow velocity measurement. In particular this invention relates to a method for measuring the vortex shedding frequency to accurately measure low velocities of fluid flows.

2. Description of the Relevant Art

Electronic package designers need to characterize the performance of their products in many ways. One such characterization is in the form of heat transfer as a function of air velocity. The thermal performance of packaging has become an increasingly important issue in recent years. The high performance device market has created a demand for increasing chip densities and increasing chip complexities. Both properties lead to increased power consumption, which in turn leads to increased heat dissipation. The heat transfer characterization typically involves measurement of air velocities from 0 m/s to 3 m/s. Air velocity measurement accuracy is particularly important in the velocity range between 0.25 m/s and 1 m/s, since this is the range of most customer applications.

High accuracy velocity measurement instruments are available. One such instrument uses Digital Particle Image Velocimetry (DPIV), in which particles in the flow stream are tracked and their velocities determined with digital image processing. Another such instrument uses Laser Doppler Velocimetry (LDV), in which the Doppler shift induced on a laser beam passing through the flow stream is determined. Instruments of these types are very expensive.

Inexpensive velocity measurement instruments are available. Examples of these instruments include the Venturi meter, the Pitot tube, and the Pitot-static tube. These instruments rely on the use of Bernoulli's equation to determine fluid flow velocity. At low velocities, the accuracy of these instruments suffers due to the development of boundary layers around the instruments. As the velocity decreases, the measurement error increases exponentially, and the uncertainty cannot be determined. For a typical Pitot-static probe with a 0.25 mm hole in an air stream at standard conditions, the uncertainty of the velocity measurement becomes indeterminate below 1.73 m/s.

Hence, a need exists for a method of fluid flow velocity measurement which is both accurate at low velocities and is inexpensive to implement.

SUMMARY OF THE INVENTION

The problem outlined above is in large part solved by an apparatus which measures the frequency of vortex shedding from an obstruction in a fluid flow stream. A dimensionless constant known as the Strouhal number is used to relate the measured vortex shedding frequency to the fluid flow velocity. The Strouhal number is a function of the Reynolds number for the obstruction, which is also a function of fluid flow velocity. Hence, an iterative technique is used, first using an estimated Strouhal number to estimate the fluid flow velocity, using the estimated fluid flow velocity to estimate the Reynolds number, then using the Reynolds number to get a better estimate of the Strouhal number. The apparatus repeats this cycle until the estimate of the fluid flow velocity converges.

Broadly speaking, the present invention contemplates a method for determining a fluid flow velocity which comprises placing an obstruction in a fluid flow stream and measuring the frequency of vortex shedding with a sensor. The method further comprises a calculation to convert the vortex shedding frequency into a fluid flow velocity measurement.

BRIEF DESCRIPTION OF THE DRAWINGS

Other objects and advantages of the invention will become apparent upon reading the following detailed description and upon reference to the accompanying drawings in which.

Figure 1:
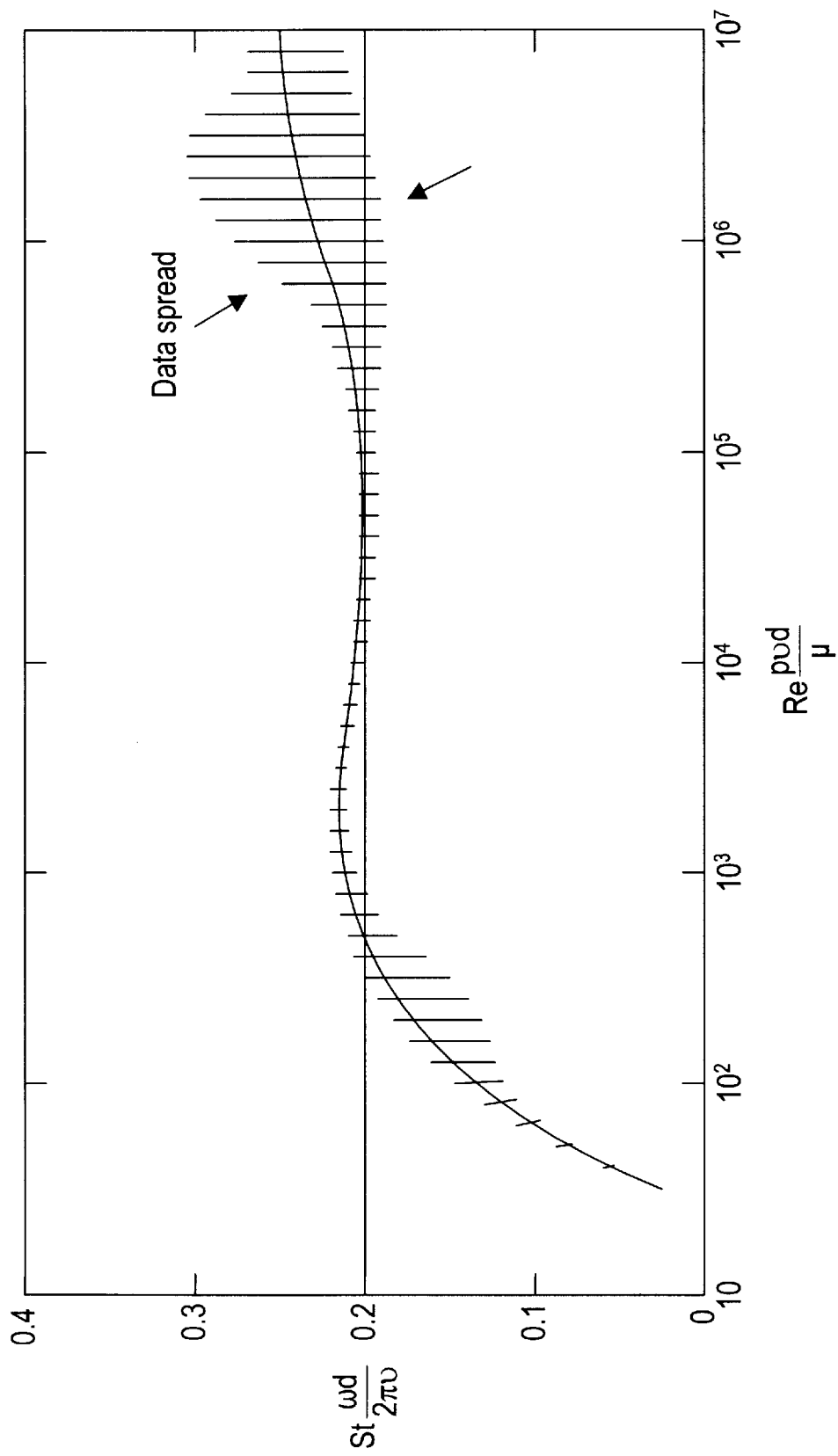
FIG. 1 is a graph depicting the Strouhal number as a function of the Reynolds number.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Scientists who study fluid flow streams have long known that the fluid flow patterns of different types of fluids moving at different velocities around differently sized objects exhibit a similarity. In other words, under certain conditions the flow patterns are the same, in spite of fluid flow stream differences. The flow patterns for different fluid flow streams are the same when their Reynolds number is the same. The Reynolds number is defined as $$Re = (\text{density} \times \text{velocity} \times \text{characteristic length})/(\text{kinematic viscosity}).$$

If the fluid density, flow velocity, characteristic length, and kinematic viscosity are measured in the same way for the different fluid flow streams, and they yield the same Reynolds numbers, then the fluid flow patterns for the different fluid flow streams are the same.

It is noted that the characteristic length of a body may be arbitrarily defined, as long as the characteristic length is representative of the size of the body. Hereafter, the characteristic length is assumed to be the maximum width of a body in a direction parallel to the direction of fluid flow. Other definitions may be used without altering the application of this relationship.

Consider a fluid flow stream around a cylindrical obstruction. When the fluid flow stream has a Reynolds number between 45 and $10^7$, the flow pattern is characterized by a Kármán vortex street downstream of the cylinder. The Kármán vortex street is the result of vortices which periodically form behind the cylinder, detach, and swim downstream with the flow. The formation and detachment of vortices is periodic, which means there is a predictable time interval between the detachment, or shedding, of vortices. This in turn implies there is a measurable shedding frequency. A parameter known as the Strouhal number is defined as St=(frequency×characteristic length)/velocity.

This parameter, when known, establishes a relationship between the shedding frequency and the velocity of fluid flow. As shown in FIG. 1, this parameter has been measured experimentally for the entire range of Reynolds numbers between 45 and $10^7$. Above Re=$10^5$, the fluid flow becomes more turbulent, causing a range of unpredictability for the shedding frequency and hence the Strouhal number. From FIG. 1 it can be seen that in the range of Reynolds numbers between 200 and $10^5$, the Strouhal number is fairly constant and exhibits only a small degree of uncertainty. In this range, the Strouhal number varies from about 0.20 to 0.21.

Figure 2:
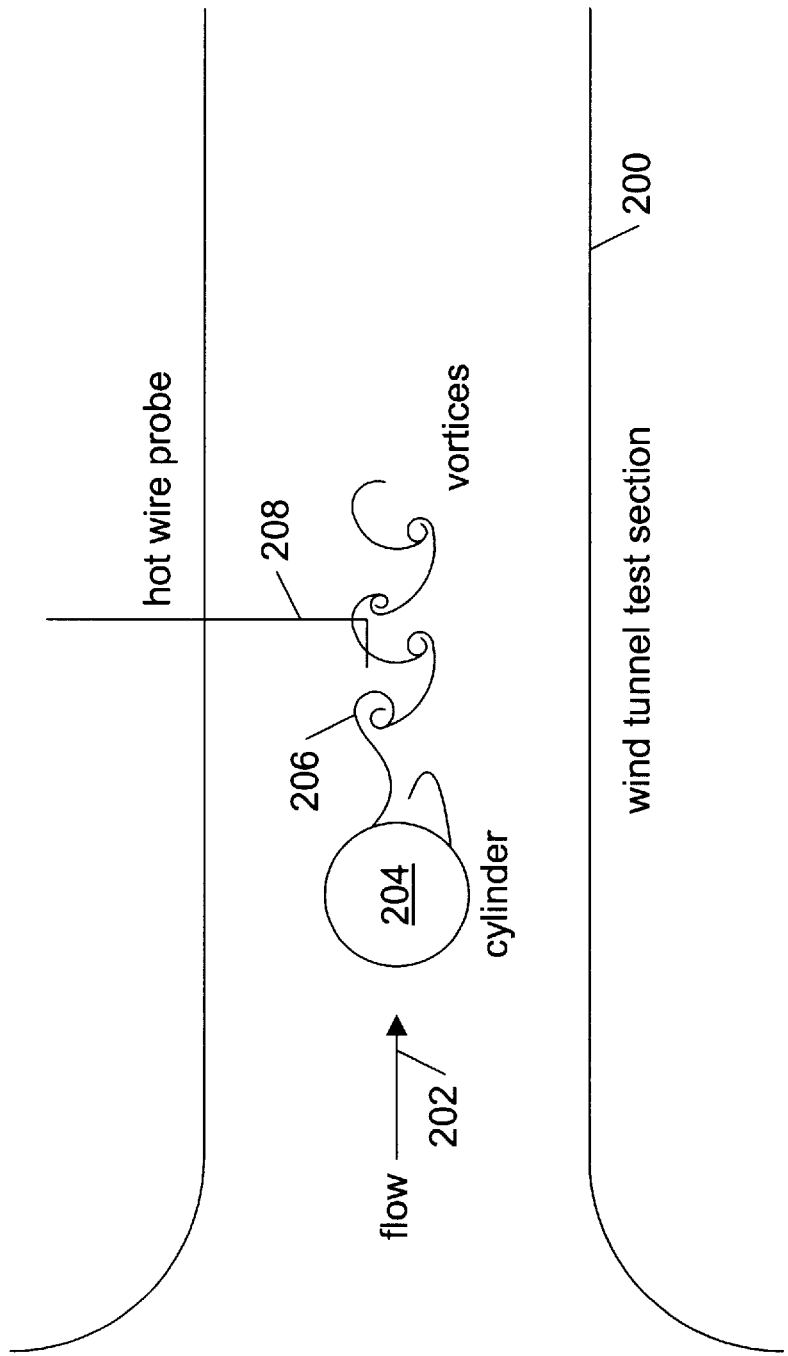
FIG. 2 is a schematic diagram of a wind tunnel with an air velocity measurement apparatus according to present invention having a first sensor embodiment.

Turning now to FIG. 2, a schematic diagram of a wind tunnel 200 is shown. Wind tunnel carries an air flow 202 at a velocity v past a circular cylinder 204 of diameter d. Cylinder diameter d is chosen so that for the desired velocity measurement range, the Reynolds number is in the range between 45 and $10^7$. In a preferred embodiment, the height of wind tunnel 200 is greater than 4 times the chosen diameter of circular cylinder 204 to avoid wall interference effects.

Air flow 202 creates vortex street 206, a sequence of vortices which form behind circular cylinder 204 and detach with a shedding frequency f. A hot wire probe 208 is placed in vortex street 206. As vortices pass hot wire probe 208, hot wire probe 208 experiences an increase and subsequent decrease in the rate of heat loss. The changes in heat loss are converted to an electrical signal by hot wire probe 208. The electrical signal is then processed to yield a shedding frequency measurement. A computation unit then converts the frequency measurement into an air flow velocity measurement.

In one embodiment, the height of the wind tunnel is 61 cm and the desired velocity measurement range includes 0.25 m/s to 1.0 m/s. Under standard atmospheric conditions, the following table indicates the Reynolds numbers for a range of suitable cylinder diameters.

| | Reynolds Numbers | | | |
|---|---|---|---|---|
| v (m/s) | d = 7.62 cm | d = 10.16 cm | d = 12.70 cm | d = 15.24 cm |
| 0.25 | 1300 | 1740 | 2170 | 2610 |
| 0.50 | 2620 | 3490 | 4360 | 5230 |
| 0.75 | 3910 | 5220 | 6320 | 7830 |
| 1.00 | 5220 | 6960 | 8690 | 10430 |

In this embodiment, since the Reynolds numbers are in the range where the Strouhal number is fairly constant, the computation unit can assume a Strouhal number of 0.205. The computation of velocity from frequency is then accomplished by manipulating the definition of the Strouhal number to yield v=(f·d)/St.

The accuracy of this approach is ±2.9 percent or better. The accuracy can be improved by using the computed velocity to determine an estimated Reynolds number, which can then be used to look up a more accurate Strouhal number. The new Strouhal number is used to compute a more accurate velocity. These steps can be repeated until the velocity converges. This provides a significantly increased accuracy.

Another approach is to experimentally measure the relationship between shedding frequency and fluid flow velocity. The relationship would then be stored in a lookup table in memory, or the relationship can be expressed in the form of an easily computable model. This approach also provides an increased accuracy.

Figure 3:
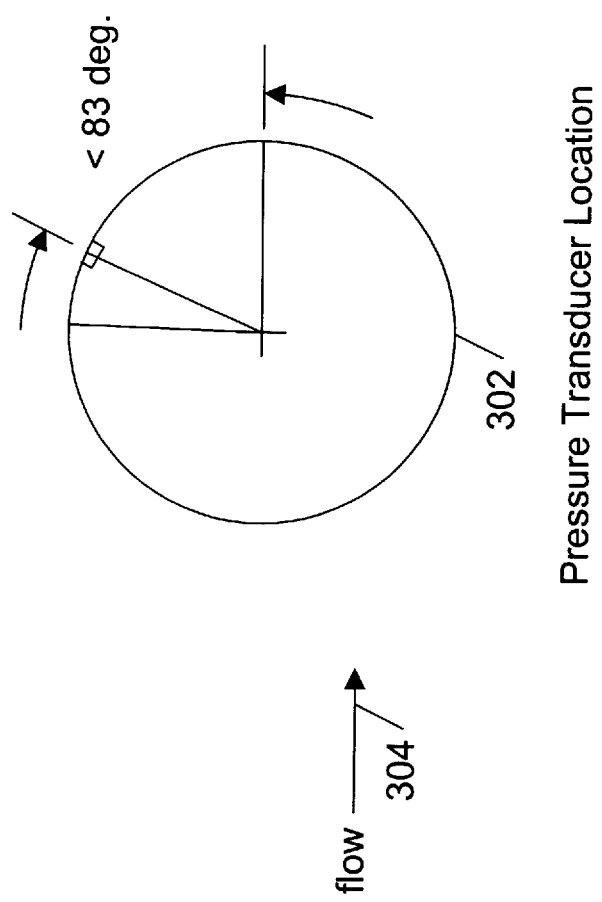
FIG. 3 is a schematic diagram of a fluid flow velocity measurement apparatus according to present invention having a second sensor embodiment.

Turning now to FIG. 3, a circular cylinder 302 is placed in a fluid flow 304. Embedded in the surface of circular cylinder 302 at an angle of less than 83 degrees (the point of laminar flow separation) from the downstream direction is a pressure transducer 306. It is expected that as a vortex forms, the fluid pressure exerted on pressure transducer 306 will decrease until shortly after the vortex detaches from the cylinder. It is expected that subsequent to vortex detachment, the fluid pressure exerted on pressure transducer 306 will rise until another vortex begins to form. Pressure transducer 306 coverts the pressure changes into an electrical signal which can be processed to determine a shedding frequency.

Although the discussed embodiments specify the usage of a circular cylinder as an obstruction to the flow stream, it should be noted that any obstruction which periodically generates vortices may be used.

Numerous variations and modifications will become apparent to those skilled in the art once the above disclosure is fully appreciated. It is intended that the following claims be interpreted to embrace all such variations and modifications.

What is claimed is:

1. A fluid flow velocity measurement apparatus comprising:

an obstruction in a fluid flow stream, said obstruction configured to shed a sequence of vortices;

a sensor configured to measure a shedding frequency of said sequence of vortices; and a unit coupled to the sensor to receive said shedding frequency, wherein the unit is configured to calculate a fluid flow velocity V using a first estimate of a Strouhal number St, wherein the unit is configured to calculate a first estimate of a Reynolds number Re, wherein the unit calculates the fluid flow velocity V according to the equation V=FD/St, wherein F is the shedding frequency, and D is a characteristic length of said obstruction, wherein the unit calculates the Reynolds number Re according to the equation Re=PVD/N, wherein P is a density of said fluid flow stream, D is a characteristic length of said obstruction, and N is a kinematic viscosity of said fluid flow stream, wherein the unit is configured to determine a second estimate of the Strouhal number St using the first estimate of the Reynolds number Re, and wherein the unit is configured to calculate an improved estimate of the fluid flow velocity using the second estimate of the Strouhal number St.

2. The fluid flow velocity measurement apparatus as recited in claim 1, wherein said fluid flow stream comprises air.

3. The fluid flow velocity measurement apparatus as recited in claim 1, wherein said obstruction is a cylinder with an axis oriented perpendicular to a direction of fluid flow.

4. The fluid flow velocity measurement apparatus as recited in claim 1, wherein said sensor is a hot wire probe positioned downstream of said obstruction in a path of said sequence of vortices.

5. The fluid flow velocity measurement apparatus as recited in claim 1, wherein said sensor is a pressure transducer positioned on the obstruction downstream of a laminar separation point.

6. A method for fluid flow velocity measurement which comprises the steps of:

measuring a shedding frequency F of a sequence of vortices produced by an obstruction in a fluid flow stream;

calculating a first estimate of a fluid flow velocity V using a first estimate of a Strouhal number St according to a first equation V=FD/St wherein D is a characteristic length of the obstruction calculating a first estimate of a Reynolds number Re using the first estimate of the fluid flow velocity V according to a second equation Re=PVD/N, wherein P is a density of the fluid flow stream and N is a kinematic viscosity of the fluid flow stream;

determining a second estimate of the Strouhal number using a lookup table;

calculating an improved estimate of the fluid flow velocity V using the second estimate of the Strouhal number according to the first equation.

7. A fluid flow velocity measurement apparatus comprising:

an obstruction in a fluid flow stream configured to shed a sequence of vortices, wherein the obstruction has a characteristic length D, wherein the fluid flow stream has a density P and a kinematic viscosity N, and wherein the sequence of vortices has a shedding frequency F;

a sensor configured to measure the shedding frequency F of the sequence of vortices;

a unit coupled to the sensor to receive the shedding frequency F and configured to determine a first estimate $V_1$ of a fluid flow velocity using a first estimate $St_1$ of a Strouhal number according to a first equation $V_1$=FD/$St_1$, wherein the unit is also configured to determine a first estimate $Re_1$ of a Reynolds number using the first estimate $V_1$ according to a second equation $Re_1$=$V_1$(PD/N), wherein the unit is further configured to determine a second estimate $St_2$ of the Strouhal number using the first estimate $Re_1$, and wherein the unit is still further configured to determine a second estimate $V_2$ of the fluid flow velocity according to a third equation $V_2$=FD/$St_2$.

8. The fluid flow velocity measurement apparatus of claim 7, wherein the unit is further configured to determine a second estimate $Re_2$ of a Reynolds number using the second estimate $V_2$, wherein the unit is configured to determine a third estimate $St_3$ of the Strouhal number using the second estimate $Re_2$ and wherein the unit is configured to determine a third estimate $V_3$ of the fluid flow velocity using the third estimate $St_3$.

* * * * *